United States Patent
Guo et al.

(10) Patent No.: US 11,843,109 B2
(45) Date of Patent: Dec. 12, 2023

(54) METHOD OF PREPARING AND APPLICATION OF CARBON-SELENIUM COMPOSITES

(71) Applicant: II-VI Delaware, Inc., Wilmington, DE (US)

(72) Inventors: Yu-Guo Guo, Beijing (CN); Shuaifeng Zhang, Beijing (CN); Yaxia Yin, Beijing (CN)

(73) Assignee: II-VI DELAWARE, INC., Wilmington, DE (US)

( * ) Notice: Subject to any disclaimer, the term of this patent is extended or adjusted under 35 U.S.C. 154(b) by 174 days.

(21) Appl. No.: 16/426,228

(22) Filed: May 30, 2019

(65) Prior Publication Data
US 2019/0280285 A1    Sep. 12, 2019

Related U.S. Application Data

(62) Division of application No. 15/262,407, filed on Sep. 12, 2016, now Pat. No. 10,340,507.

(30) Foreign Application Priority Data

Sep. 22, 2015 (CN) .......................... 201510608018.4

(51) Int. Cl.
| | | |
|---|---|---|
| *H01M 4/134* | (2010.01) | |
| *H01M 4/38* | (2006.01) | |

(Continued)

(52) U.S. Cl.
CPC ......... *H01M 4/134* (2013.01); *H01M 4/1395* (2013.01); *H01M 4/362* (2013.01);

(Continued)

(58) Field of Classification Search
CPC .. H01M 50/103; H01M 50/105; H01M 4/134; H01M 4/1395; H01M 4/38
See application file for complete search history.

(56) References Cited

U.S. PATENT DOCUMENTS

| | | |
|---|---|---|
| 2,428,055 A | 9/1947 | Von Hippel et al. |
| 2011/0223487 A1 | 9/2011 | Johnson et al. |

(Continued)

FOREIGN PATENT DOCUMENTS

| | | |
|---|---|---|
| CN | 101740231 A | 6/2010 |
| CN | 102078816 A | 6/2011 |

(Continued)

OTHER PUBLICATIONS

C. Zhao et al: "Facile synthesis of selenium/potassium tratrate derived porous carbon composite as an advanced Li—Se battery cathode—RSC Advances (RSC Publishing)", RSC Advances, 2016, 15 pages.

(Continued)

*Primary Examiner* — Jonathan G Jelsma
(74) *Attorney, Agent, or Firm* — Blank Rome LLP (57) ABSTRACT

The present invention discloses a preparation method to make lithium selenium secondary battery cathode materials with a high energy density and stable electrochemical performances. Two dimensional carbon materials prepared from the presently-disclosed method is not only made from readily-available low-cost raw materials, but is also of simple preparation method. It can effectively shorten the migration distance of lithium ions in the charging and discharging process and improve conductivity and utilization of selenium after compounded with carbon and selenium; the selenium carbon cathode material can be assembled into lithium selenium secondary batteries with high energy density and stable electrochemical performances. By further scaling up, the assembled lithium selenium pouch-cell batteries still hold excellent electrochemical performances and high energy density, showing broad application prospects.

20 Claims, 5 Drawing Sheets

(51) Int. Cl.
H01M 4/1395 (2010.01)
H01M 10/052 (2010.01)
H01M 4/36 (2006.01)
H01M 4/62 (2006.01)
H01M 4/58 (2010.01)
H01M 50/429 (2021.01)

(52) U.S. Cl.
CPC .............. H01M 4/38 (2013.01); H01M 4/625 (2013.01); *H01M 4/581* (2013.01); *H01M 10/052* (2013.01); *H01M 50/429* (2021.01)

(56) References Cited

U.S. PATENT DOCUMENTS

| | | | |
|---|---|---|---|
| 2011/0250506 A1* | 10/2011 | Koshina | H01M 4/38 429/338 |
| 2012/0225352 A1 | 9/2012 | Abouimrane et al. | |
| 2015/0064575 A1 | 3/2015 | He et al. | |
| 2016/0020491 A1 | 1/2016 | Dai et al. | |

FOREIGN PATENT DOCUMENTS

| | | | |
|---|---|---|---|
| CN | 103178246 A | | 6/2013 |
| CN | 103187559 A | * | 7/2013 |
| CN | 103187559 A | | 7/2013 |
| CN | 103332688 A | | 10/2013 |
| CN | 103700820 A | * | 4/2014 |
| CN | 104201349 A | | 12/2014 |
| CN | 104201389 A | | 12/2014 |
| CN | 104393304 A | | 3/2015 |
| CN | 104617299 A | | 5/2015 |
| CN | 104733677 A | | 6/2015 |
| JP | 2011509509 A | | 3/2011 |
| JP | 2013225496 A | | 10/2013 |
| KR | 20150104314 A | | 9/2015 |

OTHER PUBLICATIONS

Park, Principles and Applications of Lithium Secondary Batteries, 2010, pp. 118-119, Hongreung Science Publishing Company; (Korean original and English translation).
Abouimrane et al., "A New Class of Lithium and Sodium Rechargeable Batteries Based on Selenium and Selenium-Sulfur as a Positive Electrode", Journal of American Chemical Society, 2012, pp. 4505-4508, vol. 134.
Chen et al., "Graphene-Based Three-Dimensional Hierarchical Sandwich-type Architecture for High-Performance Li/S Batteries", Nano Letters, 2013, pp. 4642-4649, vol. 13.
Han et al., "A Free-Standing and Ultralong-life Lithium-Selenium Battery Cathode Enabled by 3D Mesoporous Carbon/Graphene Hierachical Architecture", Adv. Funct. Mater., 2015, pp. 455-463, vol. 25.
Jiang et al., "Selenium encapsulated into 3D interconnected hierarchical porous carbon aerogels for lithium-selenium batteries with high rate performance and cycling stability", Journal of Power Sources, Jun. 2, 2014 (online), pp. 394-404, vol. 267.
Lee et al., "Micro- and Mesoporous Carbide-Derived Carbon-Selenium Cathodes for High-Performance Lithium Selenium Batteries", Adv. Energy Mater., 2014, pp. 1-7.
Li et al., "A New Salt-Baked Approach for Confining Selenium in Metal Complex-Derived Porous Carbon with Superior Lithium Storage Properties", Advanced Functional Materials, 2015, pp. 5229-5238, vol. 25.
Li et al., "MOF-derived, N-doped, hierarchically porous carbon sponges as immobilizers to confine selenium as cathodes for Li—Se batteries with superior storage capacity and perfect cycling stability", Nanoscale, 2015, pp. 9597-9606, vol. 7.
Liu et al., "Enhanced electrochemical performances of mesoporous carbon microsphere/selenium composites by controlling the pore structure and nitrogen doping", Electrochimica Acta, 2015, pp. 140-148, vol. 153.
Liu et al., "A Se/C Composite as Cathode Material for Rechargeable Lithium Batteries with Good Electrochemical Performance", RSC Advances, 2014, pp. 9086-9091, vol. 4.
Luo et al., "Selenium@mesoporous Carbon Composite with Superior Lithium and Sodium Storage Capacity", ACSNANO, 2013, pp. 8003-8010, vol. 7, No. 9.
Sevilla et al., "A general and facile synthesis strategy towards highly porous carbons: Carbonization of organic salts", Journal of Materials Chemistry A, Oct. 14, 2013 (online), pp. 13738-13741, vol. 1, Issue 44.
Wu et al., "High-Performance Lithium Selenium Battery with Se/Microporous Carbon Composite Cathode and Carbonate-Based Electrolyte", Science China Materials, 2015, pp. 91-97, vol. 58.
Wu et al., "Lithium Iodide as a Promising Electrolyte Additive for Lithium-Sulfur Batteries: Mechanisms of Performance Enhancement", Adv. Mater., 2015, pp. 101-108, vol. 27.
Yang et al., "Elemental Selenium for Electrochemical Energy Storage", J. Phys. Chem. Lett., 2015, pp. 256-266, vol. 6.
Ye et al., "Advanced Se—C Nanocomposites: a Bifunctional Electrode Material for both Li—Se and Li-ion Batteries", J. Mater. Chem. A., 2014, pp. 1-6.

* cited by examiner

METHOD OF PREPARING AND APPLICATION OF CARBON-SELENIUM COMPOSITES

CROSS-REFERENCE TO RELATED APPLICATIONS

This application is a divisional of U.S. patent application Ser. No. 15/262,407, filed on Sep. 12, 2016, which claims priority to Chinese Patent Application No. 201510608018.4, filed on Sep. 22, 2015, the disclosure of each of which are hereby incorporated in their entirety by reference.

BACKGROUND OF THE INVENTION

Field of the Invention

The present invention relates to the field of lithium secondary batteries of high energy density, particularly relates to a novel preparation method of carbon-selenium nanocomposite materials and their applications.

Description of Related Art

With the increasing human demand for energy, secondary batteries with high energy density and high volume energy density, such as lithium-sulfur batteries and lithium-selenium batteries, have attracted widespread interests. Group 6A elements in the periodical table, such as sulfur and selenium, have shown two-electron reaction mechanisms in the electrochemical reaction process with lithium. Despite the theoretical mass energy specific capacity of selenium (675 mA h/g) is lower than that of sulfur (1675 mA h/g), selenium has a higher density (4.82 $g/cm^3$) than sulfur (2.07 $g/cm^3$); therefore the theoretical volume energy density of selenium (3253 $mAh/cm^3$) is close to the theoretical volumetric energy density of sulfur (3467 $mAh/cm^3$). At the same time, as compared with sulfur, close to an electrically insulated material, selenium is semi-conductive electrically and shows better electrically conductive property. Therefore, as compared to sulfur, selenium can demonstrate a higher level of activity and better utilization efficiency even at a higher loading level, leading to high surface density battery systems. Moreover, selenium-carbon composite can have a further improvement in the electrical conductivity over sulfur-carbon composite to obtain a higher activity electrode material. As described in the patent CN104393304A, by passing hydrogen selenide gas through graphene dispersion solution, the solvent heat reduces the graphene oxide into graphene while oxidized the hydrogen selenide into selenium. The such prepared selenium graphene electrode materials pairs with ethers electrolyte system, 1.5M lithium bi-trifluoromethane sulfonimide (LiTFSI)/1,3-dioxolane (DOL)+dimethyl ether (DME) (Volume ratio 1:1); the charging specific capacity reaches 640 mA h/g (approaching selenium theoretical specific capacity) in the first cycle. But in the charge-discharge process, polyselenide ions dissolve in the electrolyte, showing significant amounts of the shuttling effect, which causes the subsequent capacity decay. At the same time, the procedures for preparing the graphene oxide raw material that is used in this process are complicated, not suitable for industrial production. CN104201389A patent discloses a lithium-selenium battery cathode material, utilizing a nitrogen-containing layered porous carbon composite current-collector which was compounded with selenium. In preparing nitrogen-containing layered porous carbon composite current collector, nitrogen-containing conductive polymer is first deposited or grown on the surface of a piece of paper, followed by alkali activation and high temperature carbonization, resulting in a nitrogen-containing layered porous carbon composite current collector with carbon fiber as network structure that supports itself; and such nitrogen-containing layered porous carbon composite current collector is then further compounded with selenium. The deposition method for preparing a conductive polymer is complicated and the process for film formation or growth is hard to control. The preparation process is complicated, which associates with undesirably high costs.

SUMMARY OF THE INVENTION

The present invention uses one-step process to prepare a two-dimensional carbon nanomaterial, which has a high degree of graphitization; the two-dimensional carbon nanomaterials are compounded with selenium to obtain a carbon-selenium composite material, which is used as a cathode material that pairs with anode material containing lithium, resulting in a lithium-selenium battery that has a high energy density and stable electrochemical performances. Similar procedures were used to further assemble a pouch cell, which also demonstrates excellent electrochemical properties.

The object of the present invention is to provide a method to prepare selenium-carbon composite material with readily available raw materials and simple preparation procedures.

Selenium-carbon composite material descripted the present invention is obtained from the preparation method that comprises the following steps:

(1) Carbonize alkali metal organic salts or alkaline earth metal organic salts in high temperature, and then wash with dilute hydrochloric acid, and dry to obtain a two-dimensional carbon material;

(2) Mix the two-dimensional carbon material obtained in step (1) with a selenium organic solution, heat and evaporate the organic solvent, and then achieve compounding selenium with the two-dimensional carbon material through a multi-stage heat ramping and soaking procedure to obtain carbon-selenium composite.

Wherein, in the step (1), the alkali metal organic salt is selected from one or several of potassium citrate, potassium gluconate, sucrose acid sodium. The alkaline earth metal organic salt is selected from one or both of calcium gluconate, sucrose acid calcium. The high temperature carbonization is performed at 600-1000° C., preferably, 700-900° C.; carbonation time for 1-10 hours, preferably for 3-5 hours.

Wherein, step (2) of the organic solvent is selected from one or several of ethanol, dimethylsulfoxide (DMSO), toluene, acetonitrile, N,N-dimethylformamide (DMF), carbon tetrachloride, diethyl ether or ethyl acetate; multi-heat ramping & soaking section is referred as to a ramping rate 2-10° C./min, preferably 5-8° C./min, to a temperature between 200 and 300° C., preferably between 220 and 280° C., followed by soaking at the temperature for 3-10 hours, preferably, 3-4 hours; then continue to heat up to 400° C.-600° C., preferably, 430-460° C., followed by soaking for 10-30 hours, preferably 15-20 hours.

Another object of the present invention is to provide a lithium-selenium secondary battery that comprises the carbon-selenium composite materials. The said selenium lithium secondary battery further comprises: a lithium-containing anode, a separator, and an electrolyte.

Among them, lithium-containing anode may be one or several of lithium metal, a lithiated graphite anode, lithiated silicon carbon anode materials (through assembling the graphite and silicon-carbon anode materials and lithium anode into a half battery, discharge, to prepare lithiated graphite anode and lithiated silicon carbon anode materials). The separator (membrane) is one of the commercial celgard membrane, Whatman membrane, cellulose membrane, a polymer membrane. The electrolyte is one or several of the carbonate electrolyte, ether electrolyte, and ionic liquids. Carbonate electrolyte is selected from one or several from diethyl carbonate ester (DEC), dimethyl carbonate (DMC), ethylene carbonate (EC), ethyl methyl carbonate (EMC), and propylene carbonate (PC). The solute is selected from one or several from lithium hexafluoro phosphate ($LiPF_6$), lithium bis (trifluoromethanesulfonyl) imide (LiTFSI), lithium perchlorate ($LiClO_4$) and lithium bis(fluorosulfonyl) imide (LiFSI). In ether electrolytic solution, the solvent is selected one or several from 1,3-dioxolane (DOL), ethylene glycol dimethyl ether (DME) and triethylene glycol dimethyl ether (TEGDME); solute is selected in one or more from lithium hexafluorophosphate ($LiPF_6$), lithium bis-(trifluoromethanesulfonyl) imide (LiTFSI), lithium perchlorate ($LiClO_4$) and lithium bis-fluorosulfonylimide (LiFSI). For ionic liquids, the Ionic liquid is one or more from room temperature ionic liquid [EMIm] $NTf_2$ (1-ethyl-3-methylimidazolium bis trifluoromethane sulfonimide salt), [Py13] $NTf_2$ (N-Propyl-N-methylpyrrolidine bis trifluoromethane sulfonimide salt), [PP13] $NTf_2$ (N-propyl-methylpiperidine alkoxy-N-Bis trifluoromethane sulfonimide salts); solute is selected in one or more from lithium hexafluorophosphate ($LiPF_6$), bis(trifluoromethylsulfonyl) imide (LiTFSI), lithium perchlorate ($LiClO_4$) and lithium bis fluorosulfonylimide (LiFSI).

The present invention also provides a pouch-cell lithium-selenium battery containing the carbon selenium composite material.

Compared with the prior art, with respect to the method for preparing selenium carbon composite material in the present invention, the two-dimensional carbon material is not only of the advantages in that the raw materials are readily available and low cost, and preparation method is simple, highly practical and suitable for mass production, but also the obtained selenium carbon composite material exhibits excellent electrochemical properties.

DESCRIPTION OF THE INVENTION

In conjunction with the specific examples, the present invention will be further described below. Unless otherwise specified, the experimental methods in the following examples are all conventional; the reagents and materials are all available from commercial sources.

Example 1

(A) Preparation of Selenium Carbon Composite Material

Figure 1:
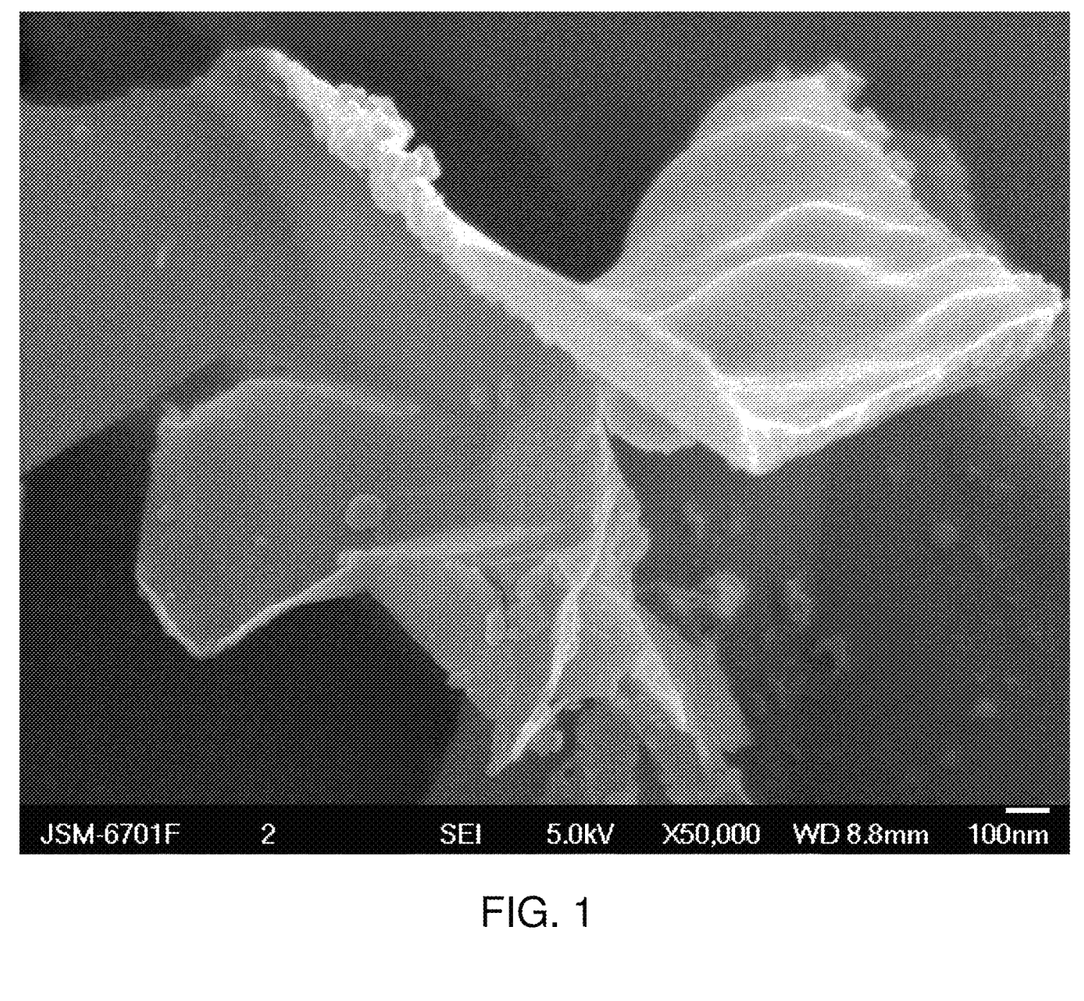
FIG. 1 is a 50,000× scanning electron microscope photograph for carbon material in the example 1.

After grinding and milling, an appropriate amount of potassium citrate is calcined at 800° C. for 5 hours under an inert atmosphere, and cooled to room temperature. Washed with dilute hydrochloric acid to a neutral pH; filtered and dried to give a two-dimensional carbon nanomaterial (FIG. 1); according to the mass ratio of 50:50, weigh the two dimensional carbon material and selenium, and then stir and mix with the ethanol solution of selenium uniformly; after solvent evaporation, dry the mixture in dry oven; the dried mixture was heated at 5° C./min to 240° C. and soaked for 3 hours; then continues to heat up at 5° C./min to 450° C.; soaked for 20 hours; cooled to room temperatures, which resulted in the selenium carbon composite material.

(B) Preparation of the Cathode Tab

The above-prepared selenium carbon composites are mixed with carbon black Super-P and binder CMC/SBR (1:1) along with water by a fixed proportions by pulping, coating, drying and other procedures to obtain selenium carbon composite cathode.

(C) Assembling Lithium-Selenium Battery

Figure 4:
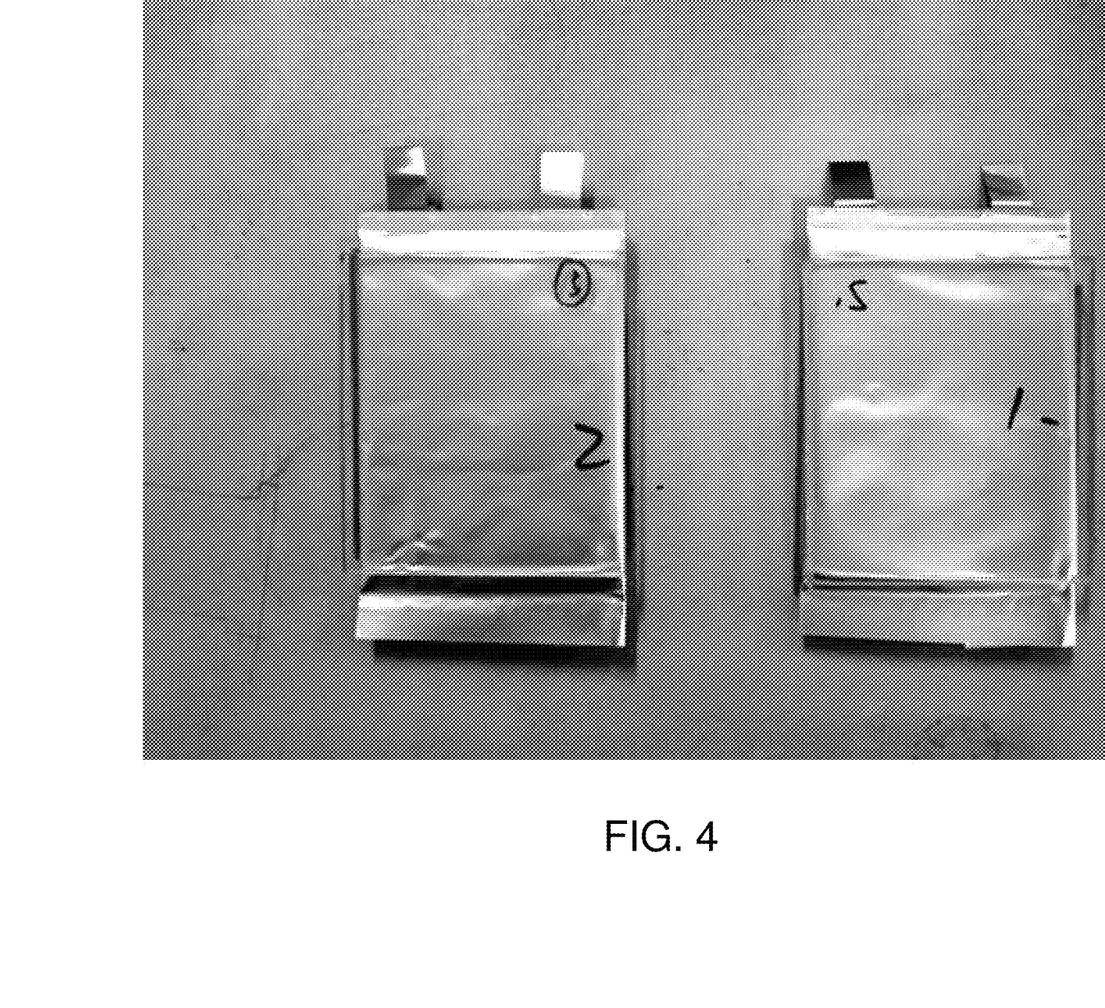
FIG. 4 is an optical image of the pouch-cell battery case in the example 1.

The above-prepared selenium carbon composite cathode, lithium foil as anode, celgard diaphragm as separator and 1M $LiPF_6$ in EC/DMC as the electrolyte were assembled into a lithium selenium button cell battery and lithium selenium pouch-cell battery (FIG. 4).

(D) Lithium-Selenium Battery Test

Figure 2:
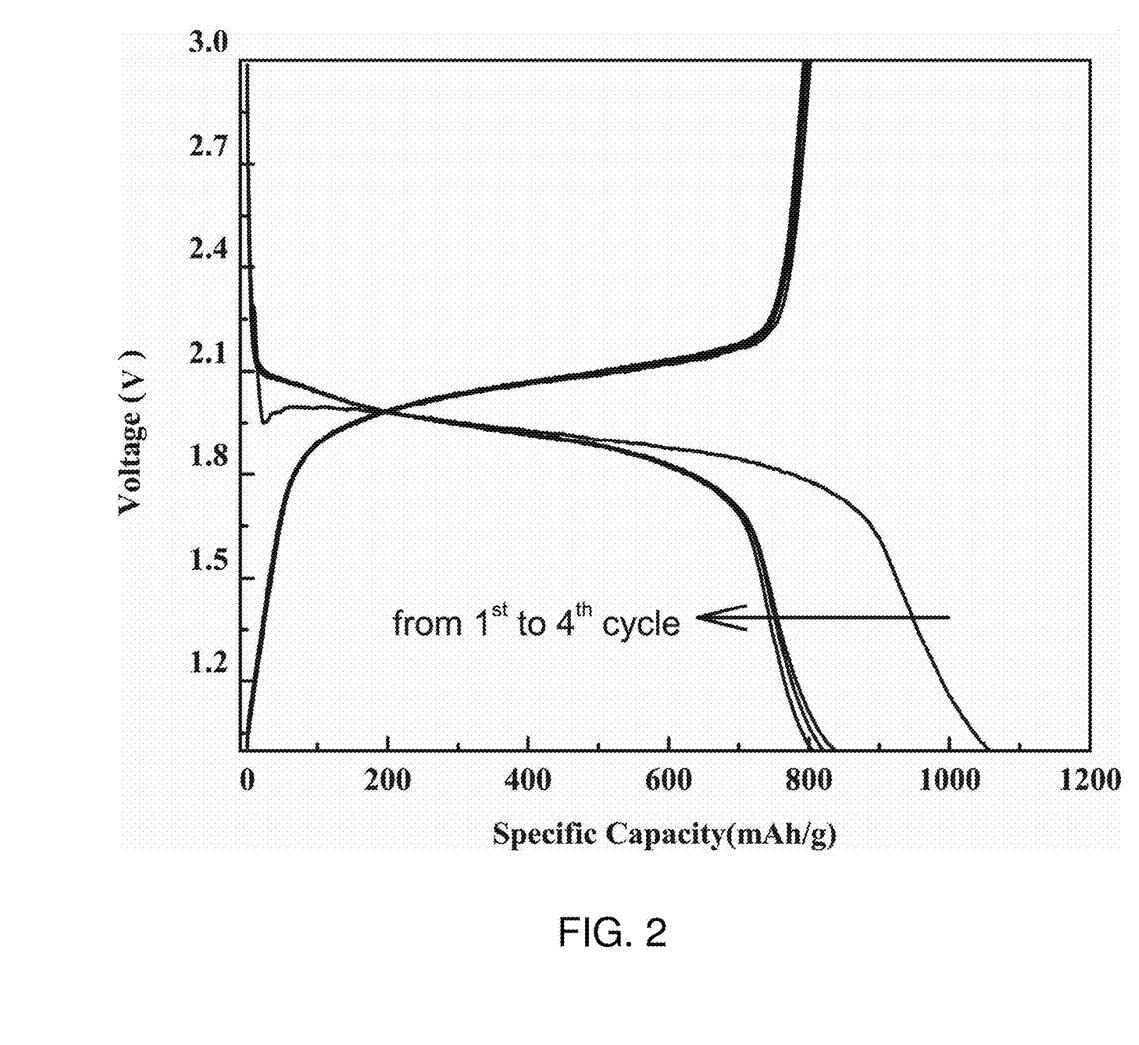
FIG. 2 is a 0.1 C charge and discharge curve of the lithium selenium battery in the example 1.
Figure 5:
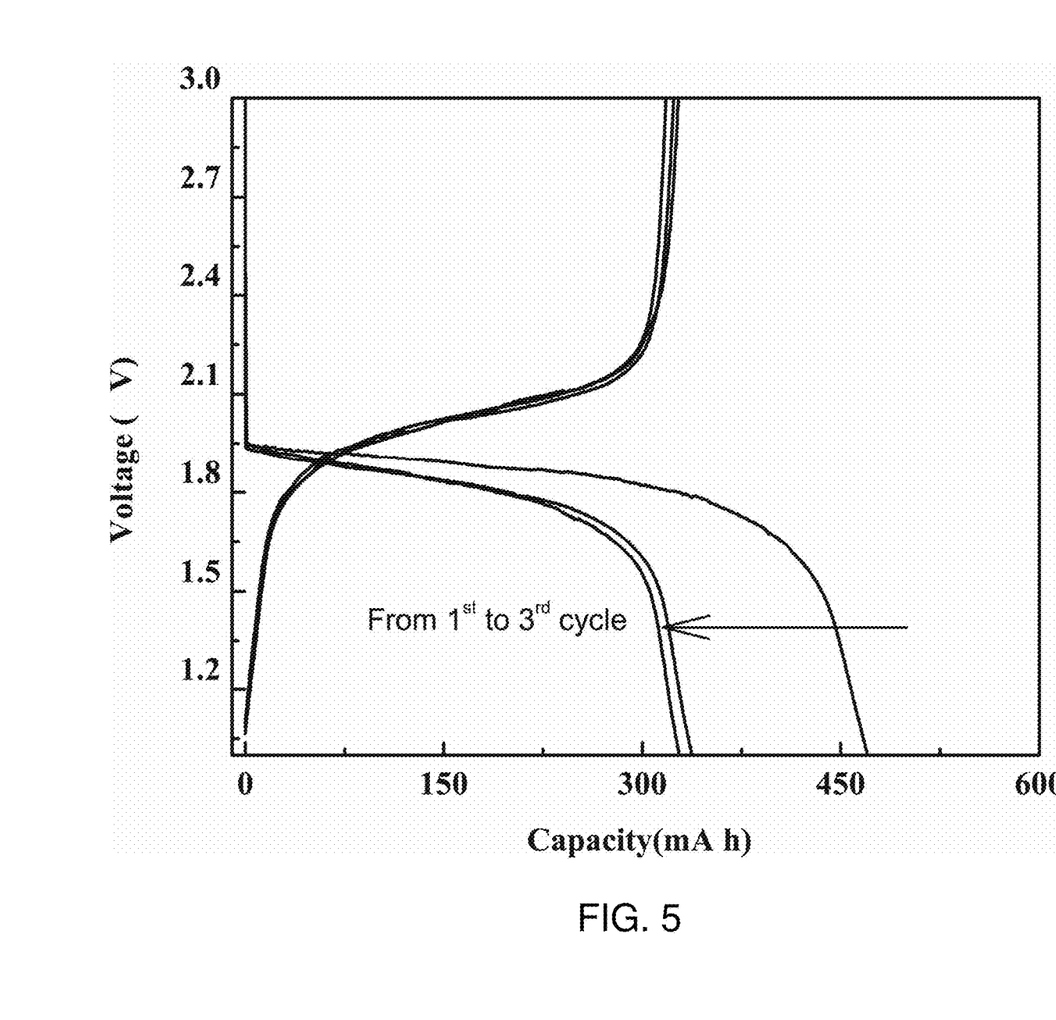
FIG. 5 is a 0.05 C charge and discharge curve of the pouch-cell battery case in the example 1.

Use a charge-discharge apparatus to do constant current charge-discharge test on the said lithium-selenium button cell battery and lithium selenium pouch-cell battery. Test voltage range is between 1.0 and 3.0 V and test temperature is 25° C. Discharge specific capacity and the level of charge-discharge current are standardly calculated based on the mass of selenium. The charge-discharge current is 0.1 C or 0.05 C. Lithium selenium button coin battery charge and discharge curve is shown in FIG. 2, the specific test results are shown in Table 1. Lithium selenium pouch-cell battery test results are shown in FIG. 5.

Example 2

Other experimental conditions are same as in Example 1; only exception is that the raw material carbonized for two-dimensional carbon is sodium citrate. Battery Test results are summarized in Table 1 below.

Example 3

Other experimental conditions are same as in Example 1; only exception is that the raw material carbonized for two-dimensional carbon is potassium gluconate. Battery Test results are summarized in Table 1 below.

Example 4

Other experimental conditions are same as in Example 1; only exception is that the high-temperature carbonization temperature for the carbon material is 650° C. Battery Test results are summarized in Table 1 below.

Example 5

Other experimental conditions are same as in Example 1; only exception is that the dried mixture was heated at 5° C./min to 300° C. and soaked at this temperature for 3 hours. Battery Test results are summarized in Table 1 below.

Example 6

Other experimental conditions are same as in Example 1; only exception is that the dried mixture was heated at 5° C.

min to 240° C. and soaked at this temperature for 3 hours, then continued to heat up to 600° C., and soaked at this constant temperature for 20 hours. Battery Test results are summarized in Table 1 below.

Example 7

Other experimental conditions are same as in Example 1; only exception is that the lithium-Se battery is packed with lithiated graphite anode, instead of the lithium anode sheet. Battery Test results are summarized in Table 1 below.

Example 8

Other experimental conditions are same as in Example 1; only exception is that the lithium-Se battery is packed with lithiated silicon carbon anode, instead of the lithium anode sheet. Battery Test results are summarized in Table 1 below.

Comparative Example 1

Other experimental conditions are the same as in Example 1; only exception is that the use of polyacrylonitrile as the raw material. Battery Test results are summarized in Table 1 below.

Comparative Example 2

Figure 3:
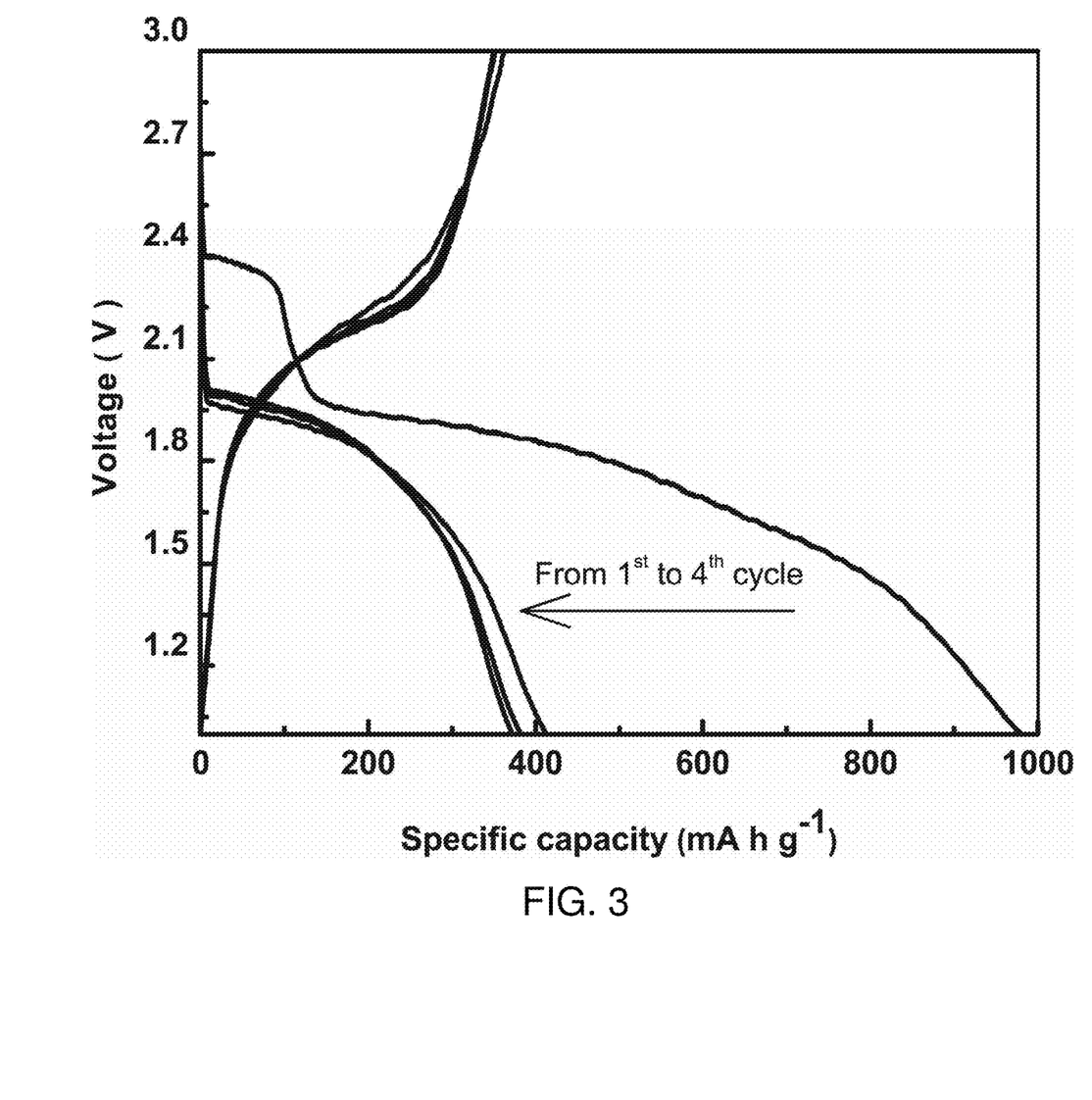
FIG. 3 is a 0.1 C charge and discharge curve of the lithium selenium battery in the comparative example 2.

Other experimental conditions are the same as in Example 1; only exception is that using one-step compound method to prepare selenium and carbon composite. The dried selenium carbon mixture was heated at 5° C./min to 500° C. and soaked at this temperature for 23 hours to obtain selenium carbon composite material. The charge-discharge curve of a battery made from the thus obtained selenium carbon composite material is shown in FIG. 3; the battery test results are summarized in Table 1 below.

TABLE 1 summarized Battery Test Results

| Numbering | The first cycle discharge capacity (MAh/g) | the first cycle Coulomb efficiency (%) | After cycling 50 laps capacity (MAh/g) |
|---|---|---|---|
| Example 1 | 1,050 | 78.1 | 756 |
| Example 2 | 940 | 74.6 | 672 |
| Example 3 | 962 | 75.3 | 683 |
| Example 4 | 987 | 72.1 | 680 |
| Example 5 | 936 | 73.2 | 653 |
| Example 6 | 972 | 70 | 661 |
| Example 7 | 836 | 72.5 | 580 |
| Example 8 | 910 | 73 | 600 |
| Comparative Example 1 | 635 | 55 | 350 |
| Comparative Example 2 | 980 | 40.8 | 386 |

Above, examples are only for the illustration of the embodiments of the present invention, which by no means is to be used in any form as a limit to the scope of the present invention. Although the present invention has been revealed above as the preferred embodiments, it is not intended to limit the present invention. Anybody with skills in the art can use the revealed technical content by making little changes or substitutions, without departing from the scope of the technical aspect of the present invention, as described above, to derive equivalent of examples of the present invention. But those that do not depart from the nature of the present invention by simple modification of any of the above embodiments or by making equivalent variations and modifications based on the technical nature of the present invention, would fall within the scope of the present invention of the technical solutions.

What is claimed is:

1. A lithium selenium secondary battery, comprising:
   a two-dimensional selenium carbon composite material as a cathode material, the two-dimensional selenium carbon composite material prepared by a method comprising:
   (a) carbonizing an alkali metal organic salt or an alkaline earth metal organic salt, washing the carbonized salt with an acid, and drying to obtain a two-dimensional carbon nanomaterial; and
   (b) mixing the two-dimensional carbon material obtained in step (a) with an organic solvent and selenium, evaporating the organic solvent from the mixture, and then conducting a multistage heat ramping and soaking process to form the two-dimensional selenium carbon composite material;
   a lithium-containing anode;
   a separator; and
   an electrolyte, wherein
   the lithium selenium secondary battery has a discharge specific capacity of at least 580 mAh/g and up to 756 mAh/g after 50 cycles of a constant current charge — discharge test with a test voltage range between 1.0 and 3.0 V and a test temperature of 25° C., and
   the two-dimensional selenium carbon composite material is free of sulfur.

2. The lithium selenium secondary battery of claim 1, wherein the lithium-containing anode comprises one or more of lithium metal, a lithiated graphite material, and a lithiated silicon carbon material.

3. The lithium selenium secondary battery of claim 1, wherein the separator is selected from a Celgard® membrane; a Whatman® membrane; a cellulose membrane; or a polymer membrane.

4. The lithium selenium secondary battery of claim 1, wherein the electrolyte is one or more of a carbonate electrolyte, an ether electrolyte, and ionic liquids.

5. The lithium selenium secondary battery of claim 4, wherein the carbonate electrolyte comprises a solvent of one or more of diethyl carbonate ester (DEC), dimethyl carbonate (DMC), ethylene carbonate (EC), ethyl methyl carbonate (EMC), propylene carbonate (PC), and a solute selected from one or more of lithium hexafluoro phosphate ($LiPF_6$), lithium Bis(trifluoromethane)sulfonimide (LiTFSI), lithium perchlorate ($LiClO_4$) and lithium bis(fluorosulfonyl)imide (LiFSI).

6. The lithium selenium secondary battery of claim 4, wherein the ether electrolyte comprises a solvent of one or more of 1,3-dioxolane (DOL), ethylene glycol dimethyl ether (DME) and triethylene glycol dimethyl ether (TEGDME), and a solute selected from one or more of lithium hexafluorophosphate ($LiPF_6$), lithium bis (trifluoromethanesulfonyl) imide (LiTFSI), lithium perchlorate ($LiClO_4$) and lithium bis(fluorosulfonyl)imide (LiFSI).

7. The lithium selenium secondary battery of claim 4, wherein the ionic liquids comprise one or more of room temperature ionic liquids selected from [EMIm] $NTf_2$ (1-ethyl-3-methylimidazolium bis trifluoromethane sulfonimide salt), [Py13] $NTf_2$ (N-Propyl-N-methylpyrrolidine bis trifluoromethane sulfonimide salt), [PP13] $NTf_2$ (N-propyl-methylpiperidine alkoxy-N-Bis trifluoromethane sulfonimide salts), and a solute selected from one or more of lithium hexafluorophosphate (LiPF$_6$), lithium Bis(trifluoromethane)sulfonimide (LiTFSI), lithium perchlorate (LiClO$_4$) and lithium bis fluorosulfonylimide (LiFSI).

8. The lithium selenium secondary battery of claim 1, wherein the battery is a pouch-cell battery.

9. The lithium selenium secondary battery of claim 1, wherein the reduction of the discharge specific capacity between the first cycle and the fiftieth cycle of the constant current charge—discharge test is no more than about 34%.

10. The lithium selenium secondary battery of claim 1, wherein the battery has a first cycle Coulomb efficiency ranging from 70 to 78.1%.

11. A lithium selenium secondary battery, comprising:
a two-dimensional selenium carbon composite material as a cathode, the two-dimensional selenium carbon composite material prepared by a method comprising:
  (a) carbonizing an alkali metal organic salt or an alkaline earth metal organic salt at a temperature≥600° C.;
  (b) washing the carbonized salt of step (a) with an acid;
  (c) drying the washed carbonized salt of step (b) to obtain a two-dimensional carbon nanomaterial;
  (d) mixing the two-dimensional carbon nanomaterial of step (c) with selenium and an organic solvent;
  (e) heating the mixture of step (d) to evaporate the organic solvent to form an organic solvent evaporated mixture; and
  (f) subjecting the organic solvent evaporated mixture of step (e) to a multistage heat ramping and soaking process to form the two-dimensional selenium carbon composite material;
a lithium-containing anode;
a separator; and
an electrolyte, wherein
  the lithium selenium secondary battery has a discharge specific capacity of at least 580 mAh/g and up to 756 mAh/g after 50 cycles of a constant current charge—discharge test with a test voltage range between 1.0 and 3.0 V and a test temperature of 25° C., and
  the two-dimensional selenium carbon composite material is free of sulfur.

12. The lithium selenium secondary battery of claim 11, wherein the lithium-containing anode comprises one or more of lithium metal, a lithiated graphite, and a lithiated silicon carbon.

13. The lithium selenium secondary battery of claim 11, wherein the separator is a commercial Celgard® membrane, a commercial Whatman® membrane, a cellulose membrane, or a polymer membrane.

14. The lithium selenium secondary battery of claim 11, wherein the electrolyte is one or more of a carbonate electrolyte, an ether electrolyte, and an ionic liquid.

15. The lithium selenium secondary battery of claim 14, wherein the carbonate electrolyte comprises a solvent and a solute; the solvent being one or more of diethyl carbonate ester (DEC), dimethyl carbonate (DMC), ethylene carbonate (EC), ethyl methyl carbonate (EMC), and propylene carbonate (PC); and the solute being one or more of lithium hexafluoro phosphate (LiPF$_6$), lithium bis(trifluoromethanesulfonyl)imide (LiTFSI), lithium perchlorate (LiClO$_4$) and lithium bis(fluorosulfonyl)imide (LiFSI).

16. The lithium selenium secondary battery of claim 14, wherein the ether electrolyte comprises a solvent and a solute; the solvent being one or more of 1,3-dioxolane (DOL), ethylene glycol dimethyl ether (DME) and triethylene glycol dimethyl ether (TEGDME); and the solute being one or more of lithium hexafluorophosphate (LiPF$_6$), lithium bis (trifluoromethanesulfonyl) imide (LiTFSI), lithium perchlorate (LiClO$_4$) and lithium bis(fluorosulfonyl)imide (LiFSI).

17. The lithium selenium secondary battery of claim 14, wherein the ionic liquid comprises a room temperature ionic liquid and a solute; the room temperature ionic liquid being one or more [EMIm] NTf$_2$ (1-ethyl-3-methylimidazolium bis trifluoromethane sulfonimide salt), [Py13] NTf$_2$ (N-Propyl-N-methylpyrrolidine bis trifluoromethane sulfonimide salt), [PP13] NTf$_2$ (N-propyl-methylpiperidine alkoxy-N-Bis trifluoromethane sulfonimide salts); and the solute being one or more of lithium hexafluorophosphate (LiPF$_6$), lithium bis(trifluoromethanesufonyl)imide (LiTFSI), lithium perchlorate (LiClO$_4$) and lithium bis (fluorosulfonyl)imide (LiFSI).

18. The lithium selenium secondary battery of claim 11, wherein the battery is a pouch-cell battery.

19. The lithium selenium secondary battery of claim 11, wherein the reduction of the discharge specific capacity between the first cycle and the fiftieth cycle of the constant current charge—discharge test is no more than about 34%.

20. The lithium selenium secondary battery of claim 11, wherein the battery has a first cycle Coulomb efficiency ranging from 70 to 78.1%.

\* \* \* \* \*